Dec. 1, 1931.  J. LEDWINKA  1,834,527
PRESSED METAL VEHICLE BODY CONSTRUCTION
Filed Dec. 6, 1929
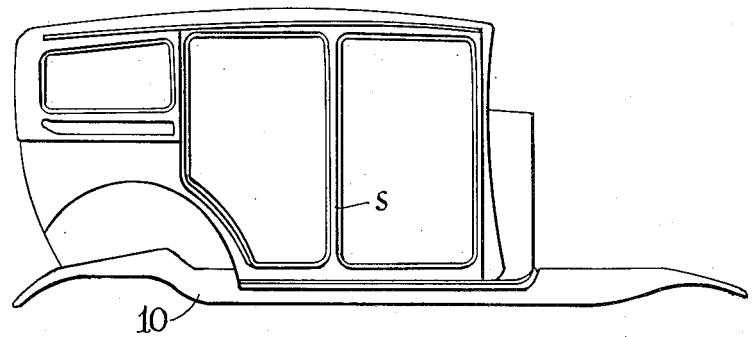
FIG.1
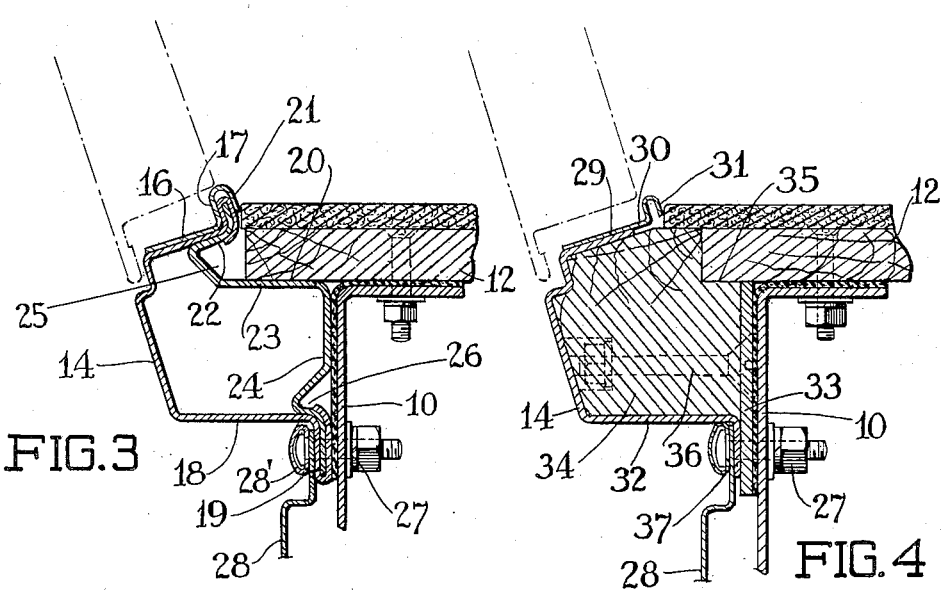
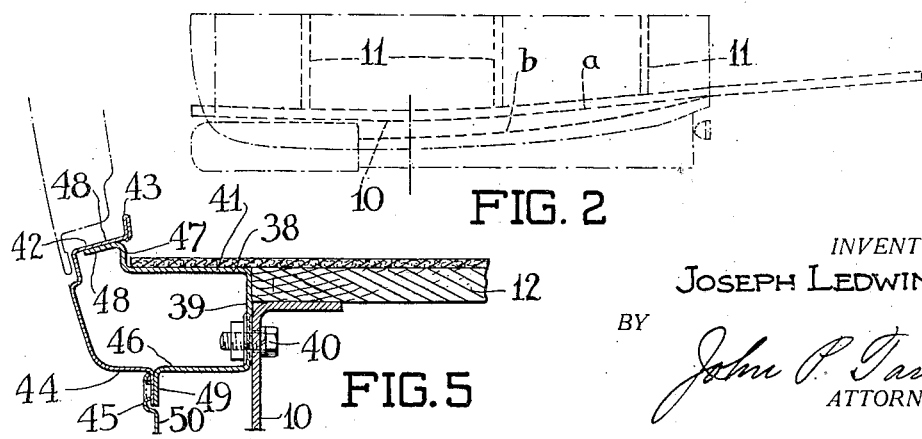
INVENTOR.
JOSEPH LEDWINKA
BY
John P. Tarbox
ATTORNEY.

Patented Dec. 1, 1931

1,834,527

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

PRESSED METAL VEHICLE BODY CONSTRUCTION

Application filed December 6, 1929. Serial No. 412,041.

My invention relates to vehicle constructions and more particularly to vehicle constructions in which the side wall of the body superstructure overhangs the side walls of the chassis which serves also as the body underframe.

Heretofore, it has been proposed in such structures to widen out the chassis side walls intermediate their ends to make their lower edges conform to the edges of the body superstructure. This required special chassis construction which it is one object of the present invention to avoid, while retaining most of the advantages of low hung body and ease of assembly of body superstructure and chassis attained by the prior construction.

According to my invention, I make the chassis, as heretofore, serve as the body underframe supporting the flooring and seat structures and secure the outer side walls of the body superstructure, which extend beyond the side walls of the chassis, particularly in their intermediate portions a substantial extent, so to bring the inner edges of the thresholds of the doors in outwardly offset relation to the outer side walls of the chassis sills, and to connect them to the side walls of said sills by an inward extension of the side walls of the body below the threshold which bridges the space between the side walls of the body superstructure and the outer side walls of the chassis.

In the drawings and detailed description forming a part of this specification, I have disclosed several embodiments of my invention now known to me. It will be obvious to those skilled in the art that changes and modifications in the precise constructions shown and described in the following detailed description when read in connection with the drawings may be made without departing from the spirit and scope of the invention as expressed herein and in the appended claims.

In the drawings,

Fig. 1 is a side elevation of a combined body and chassis construction according to the invention.

Fig. 2 is a diagrammatic plan view showing the overhanging relation between body superstructure and chassis.

Fig. 3 is a cross sectional view taken through the threshold of a door disclosing the relation between side wall of the body superstructure, thresholds and chassis sills according to one embodiment of the invention.

Figs. 4 and 5 are corresponding views of yet other embodiments of my invention.

According to my invention, the chassis may be of a usual construction embodying side sills 10 connected by cross braces 11 suitably arranged and adapted to serve also as the body cross braces. The flooring, as 12, may be directly supported on the tops of the chassis side sills and secured thereto, to additionally interbrace them. The seat structures may be mounted directly on the cross braces of the chassis or secured to the flooring 12, as found desirable.

As shown in Fig. 2, where the outer edge of the chassis is represented by the dotted line $a$ and the inner edge of the body superstructure side wall at the thresholds is indicated by dotted line $b$, there is a decided overhang of the body superstructure side wall over the edge of the chassis leaving a space between the lines $a$ and $b$.

According to the form of my invention illustrated in Figs. 1 and 3, the body superstructure, designated generally by the letter S has its side walls formed of an outer panel stamping, as 14, flanged inwardly at the doorway openings to substantially the depth of the body wall, and forming at the bottom the threshold portion 16 substantially in the plane of the body flooring and above the tops of the chassis sills and having an upwardly extending door overlap flange 17. To bridge the space between the bottom inner edge of the body superstructure as defined approximately by the inner edge flange 17 of the thresholds and the chassis sill, the lower edge of the body side panel stamping 14 is flanged inwardly at 18 to the outer side of the channel sill, where it is provided with the downwardly extending edge flange 19.

To further bridge the space between the inner line of the body wall as defined by the inner edge of the thresholds and to reinforce the body side wall below the thresholds, I provide an inner panel stamping or stampings, as 20, extending through the threshold sections and preferably through the entire outwardly offset portion of the body wall as defined by the space between the lines $a$ and $b$ of Fig. 2, the upper edge of such stamping or stampings being flanged at 21 in the door overlap of the thresholds, and secured to the outer panel by crimping the outer panel flange 17 over the edge flange 21 of the inner panel.

Below the edge flange 21, the inner panel may be outwardly extended to reinforce the threshold flange 17, as at 22, and then reversely bent and extended inwardly through a horizontal portion 23 arranged substantially in the plane of the upper side of the chassis sill 10 to bridge the space between the lower inner portion of the body wall, as defined by the thresholds, and the outer side wall of the body. From the inner edge of the portion 23 it is extended downwardly by the portion 24 seated against the outer side of the chassis sill and having its lower edge secured to the outer panel stamping 14 by crimping the edge flange 19 of the outer stamping over the edge of the portion 24.

The crimped joinder of the outer and inner panels is preferably a locked crimped joinder, both in the threshold edge portion and in the lower edge portion formed by extending the extreme edges of the flanges 18 and 19, respectively, into the recess, or groove as 25 formed adjacent the threshold edge of the inner panel by the reversely bent portion 22 and, a similar recess 26 formed adjacent the lower edge of the portion 24 of the inner panel. Additional security of joinder may be effected by welding together the flanges of the inner and outer panels in the thresholds and in their lower margins.

In this form of the invention in which a body super-structure is shown having inner and outer panels forming a hollow body side wall of great strength and rigidity because of its box section form even though stampings of relatively light gauge are used, the space between the inner edge of the body side wall as defined by the inner edge of the thresholds is thus bridged by a special formation of the outer and inner panels extending them inwardly to the side wall of the chassis sill 10. By the use of this construction the inner panel serves with the chassis sill to support the side edge of the flooring 12.

With this construction, the lower reinforced edge flange formed by the crimped joinder of flange 19 and the edge of the inner panel portion 24 may be directly bolted or otherwise secured to the outer side wall of the chassis sills, as by bolts 27, or if desired a splash board, as 28, as shown, may be secured to the outside of the reinforced flange, and the heads of the bolts 27 may be covered up by a suitable moulding 28'.

In the modification of my invention shown in Fig. 4, the outer paneling is formed as in the previous construction, except that the upward overlap flange in the threshold is omitted, the threshold flange 29 of the outer panel terminating a trifle short of the inner surface of the body wall and being extended inwardly by a separate threshold strip 30 having its inner edge bent upwardly and then reversely as at 31 to form the door overlap. At the bottom the panel flange 32 corresponds to flange 18 in Fig. 3 and is terminated in a downwardly extending flange 37 short of the outer side wall of the chassis sill, 10 to provide space to receive the attaching plate 33. To bridge the space between the inner edge of the body wall as defined by the thresholds, I employ in this case a wooden body side sill or adapter, as 34 which may be formed in the thresholds and outer portions to nest with the outer panel stamping, as shown. The inner edge of this wooden sill 34 is rabbeted at 35 to receive the edge of the flooring 12 resting on top of the chassis sill, the remaining top portion of the wooden sill between the rabbet 35 and the inner edge of the threshold being on a level with the flooring and adapted to receive the floor covering.

An attaching plate 33 is bolted as by bolts 36 to the wooden sill 34 and extends down below it to overlap the downwardly extending flange 37 of the outer panel. Panel and sill, and through them the side wall of the body superstructure are secured to the chassis side sill, as in the construction shown in Fig. 3.

In the construction according to Fig. 5, the space between the lower edge of the body side wall and the chassis sill is bridged by a separate adapter 38, this adapter comprising a separate sheet metal stamping of somewhat heavier gauge metal than the outer paneling, and being generally of channel section presenting outwardly of the body.

Its bottom wall 39 rests against the bottom outside wall of the chassis side sill to which it is secured, and through it, the body side wall, by bolting, as indicated at 40. The upper side wall of the channel is shown arranged on the level of the flooring 12 supported on the tops of the chassis sills, forming an extension thereof. It may, however, be arranged in the plane of the top of the chassis, and the flooring extended over it in a manner similar to the construction of Fig. 3. Or a portion of the upper side wall 41 may be depressed to form a rabbet to receive the edge of the flooring, as in Fig. 4.

The outer panel is formed as in the construction of Fig. 3, with a threshold portion 42 terminating in an upwardly extending reversely bent portion 43 forming the door overlap at the inner edge of the threshold.

At the bottom, the outer panel is provided with but a narrow inwardly extending flange 44 which is downwardly flanged at its inner edge, as at 45.

The outer edge of the upper and lower side walls 41 and 46 of the adapter 38 are formed for attachment to the threshold portions 42 and 45 of the outer panel, respectively. To this end upper side wall 41 is upwardly offset at 47 to provide an edge portion 48 overlapping the inside of the threshold portion 42 of the outer panel stamping, the parts being securely joined together, as by spot welding. The lower side wall 46 is formed with a downwardly extending flange 49 overlapping the flange 45 of the outer panel and being also firmly secured thereto by spot welding.

The downwardly extending flanges 49, 45 form a convenient means for the securement thereto of the splash board 50, either by welding or riveting or otherwise.

What I claim is:

1. A bottomless body superstructure having side walls provided with doorway openings and adapted to laterally overhang the sides of the chassis sills to an extent bringing the inner edges of the thresholds of said openings in outwardly offset relation to the outer sides of the chassis sills, the thresholds being substantially in the plane of the flooring and above the tops of the chassis sills and the lower edge of the body side walls below said thresholds being provided with inward extensions bridging the space between the thresholds and the outer side walls of the chassis sills and provided with means whereby they and through them the body superstructure, may be rigidly secured to the outer side walls of the chassis sills.

2. A body side wall having a doorway opening in an outwardly bulging portion thereof, the body side wall being adapted to overhang the outer side of the chassis with which it is to be used to an extent causing the inner edge of the threshold of the door to be outwardly offset from the outer side of the chassis when the body is assembled therewith, the threshold being substantially in the plane of the flooring and above the tops of the chassis sills and the body side wall being formed with an inward extension below the threshold, said inward extension being provided with means through which the body side wall may be secured to the outer side of the chassis and having a top surface formed to provide a portion of the body flooring or flooring supporting surface.

3. A vehicle construction comprising a chassis having side sills adapted to support the body flooring in its upper portions, in combination with a bottomless body superstructure widened out beyond the chassis in its wider portions so that the body wall throughout its thickness is offset laterally beyond the outer side of the chassis sills, the threshold of a doorway opening being substantially in the plane of the flooring and above the tops of the chassis sills and the lower edge of the body walls below the threshold being extended inwardly to fill the space between the normal thickness of the body side wall and the chassis and constructed to provide means through which the body side walls may be secured to the side walls of the chassis.

4. A vehicle body having a side wall overlapping the outside of the chassis sill and secured thereto, the outer edge of said body being offset outwardly from the side of the chassis in its intermediate portion a greater distance than the thickness of the body wall whereby the inner edge of the threshold of a door is outwardly offset from the outside of the chassis sill, and means bridging the space between the inner edge of the threshold and the chassis sill, the threshold being substantially in the plane of the flooring and above the tops of the chassis sills.

5. A vehicle body side wall having a doorway opening therein in a portion thereof adapted to overhang the outer side of a chassis sill with which it is to be used, the threshold of the doorway being substantially in the plane of the flooring and above the tops of the chassis sills and having its inner edge offset outwardly with respect to said chassis sill, said wall being formed with an inward extension below the threshold adapted to fill the space between the threshold and said outer side of the chassis and provided with means through which it may be secured to the outer side wall of the chassis sill, said extension having its top surface in the plane of the top of the chassis sill when assembled therewith.

6. A vehicle body side wall comprising an integral outer panel stamping extending entirely around a doorway opening and flanged inwardly at the bottom of said opening to the full depth of the door to form the threshold, the inner edge of which is outwardly offset with respect to the outer side wall of a chassis sill with which it is to be used, and a means extending said side wall inwardly to the plane of the chassis below the threshold comprising an integral extension of the lower edge of said outer panel stamping through the space separating the threshold and chassis side wall, and an inner sheet metal panel joined to the inner edge of said threshold portion of the outer panel and extended inwardly to likewise bridge the space between the inner edge of the threshold and the chassis side sill and then downwardly to an edge joinder with the extension of said outer panel stamping.

7. A vehicle body side wall comprising an integral outer panel stamping extending around a doorway opening and extended inwardly at the bottom of said opening substantially to the depth of the threshold of the door, the inner edge of said threshold being offset outwardly from the outer side of the chassis with which it is to be joined, the side wall being adapted to overhang the chassis, and being provided with means for bridging the space between said threshold and the chassis below said threshold, said means comprising a wooden sill extending between said outer panel and the side wall of the chassis and an inward extension of said outer panel below said sill to the inner edge of the sill.

8. A vehicle body side wall comprising an integral outer panel stamping extending around a doorway opening and flanged inwardly at the doorway opening to form a threshold and flanged inwardly also in its lower margin, the lower portion of said side wall below the threshold overhanging the outer side of a chassis sill with which it is adapted to be used and offset outwardly therefrom, and means for bridging the space between said side wall and chassis sill arranged below the threshold, said means comprising a pressed metal adapter, channel shaped in section, and having its bottom wall presented for securement to the outer wall of the chassis and its side walls extended outwardly and secured respectively to the threshold portion of the outer panel stamping and to the inwardly extending flange in its lower edge.

In testimony whereof I hereunto affix my signature.

JOSEPH LEDWINKA.